UNITED STATES PATENT OFFICE.

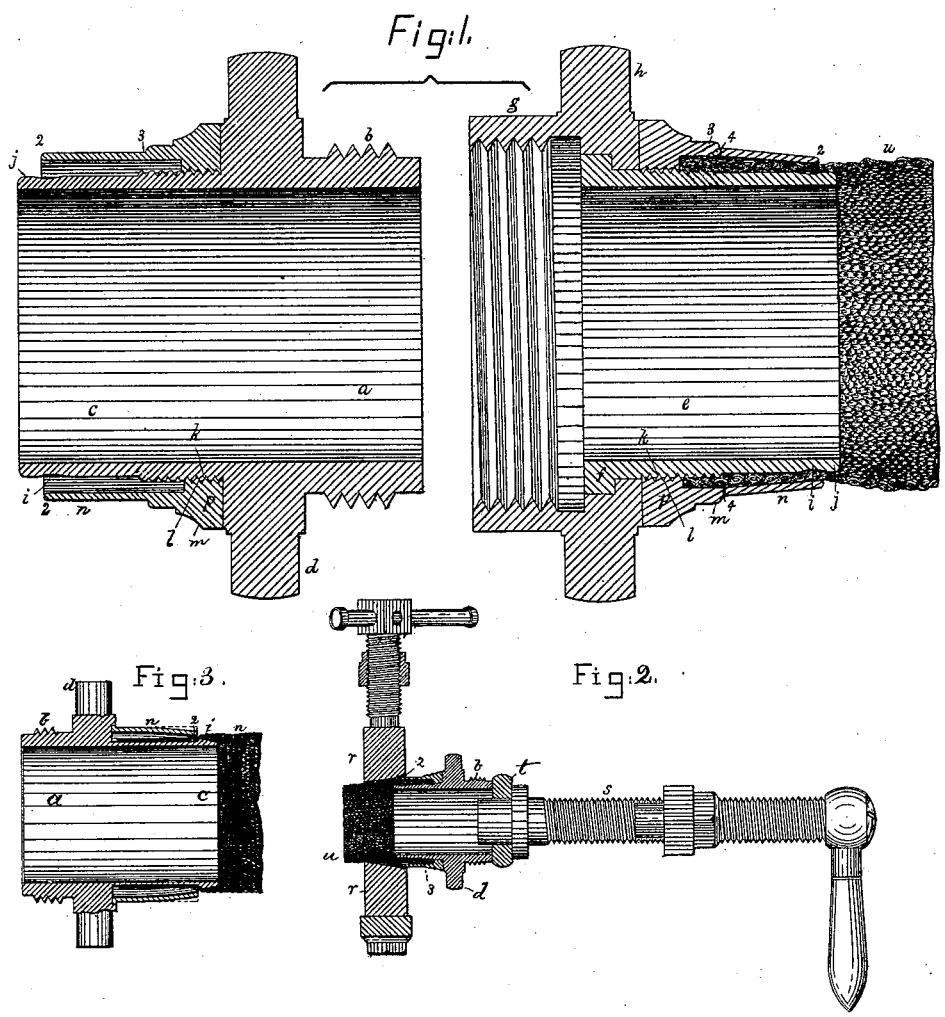
A. J. MORSE.
HOSE-COUPLINGS.
No. 195,150. Patented Sept. 11, 1877.
Witnesses.
E. C. Perkins
W. J. Pratt
Inventor.
Andrew J. Morse
per Crosby & Gregory
Atty's

ANDREW J. MORSE, OF BOSTON, MASSACHUSETTS.

IMPROVEMENT IN HOSE-COUPLINGS.

Specification forming part of Letters Patent No. 195,150, dated September 11, 1877; application filed July 30, 1877.

*To all whom it may concern:*

Be it known that I, ANDREW J. MORSE, of Boston, in the county of Suffolk and State of Massachusetts, have invented Improvements in Hose-Couplings, of which the following is a specification:

This invention has reference to hose-couplings and their method of attachment to hose.

This invention consists in the combination, with the ordinary tail-piece of a hose-coupling, (whether the tail-piece be fixed with the externally screw-threaded part of the coupling or be loosely connected with the internally screw-threaded part of the coupling,) of an outer binding-ring, contracted in diameter, and made to bind and hold the hose upon the tail-piece, substantially as herein described.

Also, in the combination, with such a tail-piece provided with a screw-thread, of an outer binding-ring, contracted in diameter to hold the hose, and provided with a screw-thread, whereby the tail-piece may be screwed out from the contracted binding-ring when it is desired to detach the coupling from the hose.

Also, in the combination, with a tail-piece provided with an annular groove, of an outer binding-ring, made of such length that when contracted in diameter its outer end will force the hose into such annular groove and hold the hose about the annularly-ribbed end of the tail-piece, substantially as described.

In a patent heretofore granted to me, No. 166,130, I have shown and described a hose-coupling each half of which had a loose tail-piece made expansible, and a loose outer or binding ring, connected by a screw-thread with the interior of the working section, or a loose connection thereof, and in Patent No. 160,696 I have shown a machine for attaching such couplings to hose.

Figure 1 of the drawings represents, in longitudinal section, the two halves of a hose-coupling constructed in accordance with my invention, the female half of the coupling having a piece of hose connected with it. Fig. 2 shows sufficient of a machine by which to apply the couplings to the hose; and Fig. 3, a modified form of the invention, wherein the screw-threads between the binding-ring and tail-piece are omitted.

The male part *a* of the coupling has a hub-like portion provided with a screw-thread, *b*, and a rigid tail-piece, *c*, and spanner-projections *d*, all as usual. The female portion of the coupling, at the right of the drawing, is composed of a tail-piece, *e*, provided with a shoulder, *f*, and a loose internally-threaded running section, *g*, provided with spanner-projections *h*, the running section being adapted to be screwed upon the thread *b* of the male section.

As so far described the parts are of ordinary construction.

Male and female parts so constructed have had the hose ends applied to the tail-pieces in various ways, viz., by means of bands, between which and the tail-pieces the hose ends have been held by either moving the tail-pieces or the band longitudinally, thereby contracting the space occupied by the hose ends, and, also, by means of rivets passed through the bands and tail-pieces.

In my Patent No. 166,130, when the interior loose ring and binding-ring are removed from the hose ends, it is necessary to cut and destroy either the interior or the binding-ring, whereas in my present invention the disconnection of all the parts of the coupling can be performed quickly without destroying any of the parts.

Each tail-piece, near its outer end, is provided with an annular groove, *i*, leaving at the end of the tail-piece an annularly-ribbed portion, *j*. Each tail-piece is also provided with a screw-thread, *k*, to receive upon it the screw-thread *l* at the interior of the binding-ring *m*, having a portion, *n*, which, when the parts are first put together, is cylindrical, as at the left of the drawing, but which, when the hose end is attached, is contracted, or made conical or tapering, by compression, as at the right of the drawing.

Hose-couplings are usually made of brass. The part *n* may be made of brass, and integral with the enlarged portion *p*, within which the screw-thread is cut; or it may be made of a separate piece of brass soldered or otherwise securely attached to the enlarged portion *p*.

When $n$ and $p$ are made in one piece I prefer that the brass be more ductile than that usually employed for hose-couplings.

In practice I prefer to make the portion $n$ of copper, or of metal more ductile than ordinary brass, joining the copper portion $n$ with the portion $p$ at the point 4. (See right of Fig. 1.)

To apply the coupling to the hose I provide a pair of strong jaws, $r$, or a suitable metallic block, with a conical opening. In front of these jaws I place a screw, $s$, hinged as described in my Patent No. 160,696, and upon the end of the screw I place a loose ring or washer, $t$, of sufficient diameter to extend across the outer end of the male or female part of the coupling.

The end of the hose $u$ is inserted in the binding-ring until its end meets the shoulder therein, then the tail-piece is inserted. In this condition the end 2 of the binding-ring is entered at the enlarged end of the conical opening or passage through the jaws, the washer $t$ is placed against the outer end of the coupling, and the screw $s$ is turned until the binding-ring is forced into the conical opening up to its shoulder 3, which action gradually contracts the binding-ring in diameter from its end 2 to such shoulder, or from the condition shown at the left to that shown at the right of Fig. 1.

The end 2 of the binding or outer ring is of such length as to terminate opposite the annular groove $i$ in the tail-piece, so that such end, when contracted, presses the hose within such groove back of the enlarged or ribbed end $j$, which aids in maintaining the hose in position.

When it desired to remove the hose from the coupling the large part of the binding-ring is securely clamped, a spanner is applied to one of the projections $d$, and the tail-piece and the portion of the coupling within the hose are turned, causing the screw-thread $k$ to follow out of and draw the tail-piece from the hose, the previously-contracted binding-ring expanding sufficiently for this purpose.

I have deemed it unnecessary to specifically describe the exact construction of the machine represented in Fig. 2, for it is substantially such a machine as is represented in my former patent already referred to, except as to the shape of the opening in the jaws.

The screw-threads $k$ $l$ have no function whatever in holding the hose and coupling together, as in other hose-couplings.

The binding-ring, made of brass and copper, or of metals of different degrees of ductility, enables me to have a hard metal for the screw-threads and a softer metal for compression or contraction.

It will be noticed that the tail-piece of the left-hand or male part of the hose is made as an integral extension of the screw-threaded portion $b$; but in the female half of the coupling the tail-piece is loose. This loose tail-piece is, however, connected with the portion $g$, and the flange $f$ retains such portion upon the tail-piece.

My former patent does not show such a tail-piece in function or operation.

The construction shown in Fig. 3 may be used when it is not desired to have the tail-piece readily removed from its binding-ring.

I do not claim a slotted pronged sleeve compressed against the outer portion of the hose by a surrounding tapering nut.

I claim—

1. The combination, with the male portion $a$ of the coupling and its connected tail-piece, of a single continuous cylindrical outer contracted binding-ring, shut upon the hose to hold it firmly between such ring and tail-piece, substantially as described.

2. The combination, with the running section $g$ and its loose tail-piece, provided with a shoulder, $f$, of a single continuous cylindrical outer contracted binding-ring, shut upon the hose between it and the tail-piece, substantially as described.

3. A tail-piece provided with a screw-thread, $k$, in combination with a contracted binding-ring, shut upon the hose between it and the tail-piece, whereby the tail-piece may drawn or screwed out from the binding-ring, substantially as described.

4. The combination, with the tail-piece, grooved substantially as described, of a single continuous cylindrical outer contracted ring, shut upon the hose between it and the tail-piece, so as to cause the end of the binding-ring to force the hose into such groove, substantially as and for the purpose described.

5. In a hose-coupling, an outer binding-ring provided with an internal screw-thread, $l$, and composed of two metals of different degrees of ductility, substantially as and for the purpose described.

In testimony whereof I have signed my name to this specification in the presence of two subscribing witnesses.

ANDREW J. MORSE.

Witnesses:
G. W. GREGORY,
W. J. PRATT.